US011194565B2

(12) United States Patent
Ryall et al.

(10) Patent No.: US 11,194,565 B2
(45) Date of Patent: Dec. 7, 2021

(54) SYSTEMS AND METHODS FOR TRACKING SOURCE CODE DEPLOYMENTS

(71) Applicants: Atlassian Pty Ltd, Sydney (AU); Atlassian, Inc., San Francisco, CA (US)

(72) Inventors: Matthew Ryall, Sydney (AU); Matthew Joseph Watson, Annandale (AU); Jonathan Lowe, Sydney (AU); Geoff Crain, Sydney (AU); Sam Tannous, Sydney (AU); Thomas Bradshaw, Sydney (AU); Piotr Plewa, Sydney (AU); Davina Adisusila, Sydney (AU); Jeroen De Raedt, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 70 days.

(21) Appl. No.: 16/457,451

(22) Filed: Jun. 28, 2019

(65) Prior Publication Data
US 2020/0004519 A1 Jan. 2, 2020

Related U.S. Application Data

(60) Provisional application No. 62/691,094, filed on Jun. 28, 2018.

(51) Int. Cl.
*G06F 9/44* (2018.01)
*G06F 8/65* (2018.01)
(Continued)

(52) U.S. Cl.
CPC .................. *G06F 8/65* (2013.01); *G06F 8/60* (2013.01); *G06F 8/70* (2013.01); *G06F 8/71* (2013.01)

(58) Field of Classification Search
None
See application file for complete search history.

(56) References Cited

U.S. PATENT DOCUMENTS 6,262,732 B1 7/2001 Coleman
8,037,453 B1 10/2011 Zawadzki
(Continued)

OTHER PUBLICATIONS

Polkovskiy, Dennis, "Comparison Between Continuous Integration Tools", Tampere University of Technology Master of Science thesis, Dated May 2016, 59 pages.
(Continued)

*Primary Examiner* — Wei Y Zhen
*Assistant Examiner* — Lanny N Ung
(74) *Attorney, Agent, or Firm* — Brownstein Hyatt Farber Schreck, LLP

(57) ABSTRACT

Methods and systems for tracking source code deployments are disclosed. The method comprises: receiving an event descriptor, the event descriptor indicating that a source code repository is updated with a source code revision; retrieving a deployment descriptor associated with the source code repository; comparing the event descriptor with the deployment descriptor to determine whether the source code revision needs to be deployed; in response to determining that the source code revision needs to be deployed, deploying the source code revision; upon commencement or completion of the source code deployment, communicating deployment information corresponding to the status of the source code deployment to a tracking system, the deployment information comprising at least a deployment identifier and a source code revision identifier, the tracking system configured to utilize the source code revision identifier to query one or more external systems and automatically retrieve further information associated with the source code revision.

16 Claims, 11 Drawing Sheets

(51) Int. Cl.
*G06F 8/60* (2018.01)
*G06F 8/71* (2018.01)
*G06F 8/70* (2018.01)

(56) References Cited

U.S. PATENT DOCUMENTS

| | | | | |
|---|---|---|---|---|
| 8,276,123 | B1* | 9/2012 | Deng | G06F 11/368 |
| | | | | 717/125 |
| 8,667,456 | B1 | 3/2014 | Czymontek et al. | |
| 8,677,315 | B1* | 3/2014 | Anderson | G06F 9/4411 |
| | | | | 717/110 |
| 9,122,558 | B2* | 9/2015 | Ewington | G06F 8/63 |
| 2006/0206867 | A1* | 9/2006 | Parsons | G06F 11/3664 |
| | | | | 717/124 |
| 2008/0195677 | A1* | 8/2008 | Sudhakar | G06F 16/128 |
| 2011/0225217 | A1 | 9/2011 | Plax | |
| 2012/0180024 | A1* | 7/2012 | Gonzalez | G06F 8/71 |
| | | | | 717/109 |
| 2013/0167120 | A1* | 6/2013 | Amano | G06F 8/71 |
| | | | | 717/122 |
| 2014/0189641 | A1 | 7/2014 | Anderson | |
| 2016/0162394 | A1 | 6/2016 | Dos Santos | |
| 2016/0170720 | A1 | 6/2016 | Xue | |
| 2016/0179828 | A1* | 6/2016 | Ellis | G06F 16/122 |
| | | | | 707/695 |
| 2016/0274903 | A1 | 9/2016 | Hill | |
| 2017/0010889 | A1 | 6/2017 | Spektor et al. | |
| 2017/0169370 | A1 | 6/2017 | Cornilescu | |
| 2020/0004518 | A1 | 1/2020 | Ryall | |

OTHER PUBLICATIONS

Fowler, Martin, "Continuous Integration", dated May 1, 2006, 15 pages, https://martinfowler.com/articles/continuousIntegration.html.

* cited by examiner

SYSTEMS AND METHODS FOR TRACKING SOURCE CODE DEPLOYMENTS

BENEFIT CLAIM

This application claims the benefit under 35 U.S.C. § 119(e) of provisional application 62/691,094, filed Jun. 28, 2018, the entire contents of which are hereby incorporated by reference for all purposes as if fully set forth herein.

TECHNICAL FIELD

Aspects of the present disclosure are directed to source code deployments, and in particular to tracking source code deployments in continuous integration systems.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Continuous integration (CI) is a software development practice that requires software developers to periodically integrate source code into a shared repository. The shared repository is usually managed by a source code management (SCM) system (also called a revision control or version control system) that tracks and manages source code as it is written and revised. The revisions (also called "commits" in Git) added to the SCM system can be automatically deployed by a CI management system into one or more environments, such as a testing environment (where the source code is tested to ensure it runs), a staging environment (where behavior of the source code is tested with realistic data) and/or a production environment (also known as a live environment as users directly interact with the source code in this environment).

It will be appreciated that each source code repository typically include hundreds if not thousands of commits that are constantly being updated and deployed and it is often very difficult for developers and/or their managers to track which commits have been deployed to which environment.

SUMMARY

The appended claims may serve as a summary of the invention.

Figure 1:
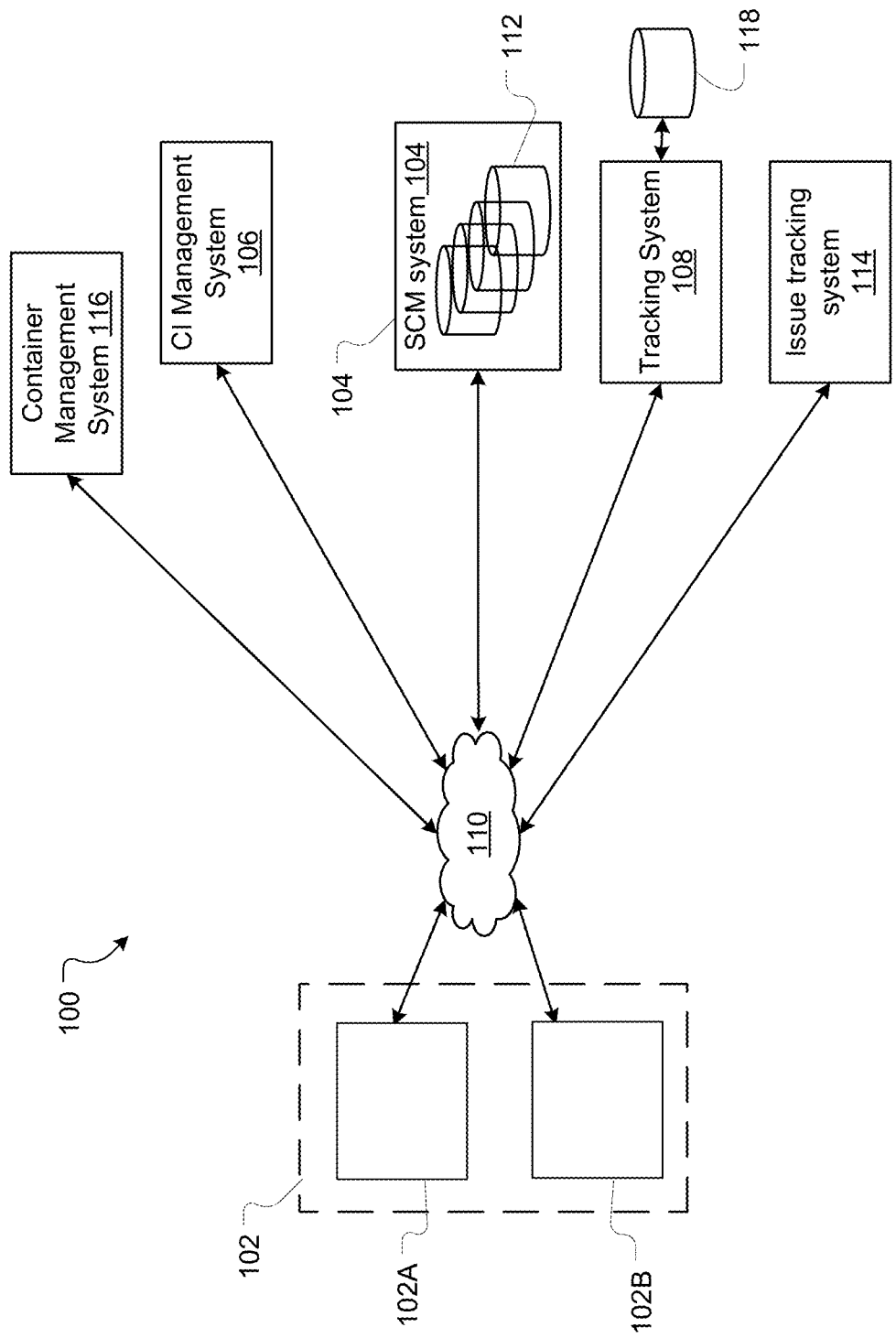
FIG. 1 is a block diagram illustrating a network environment in which aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

In the description below, Git (and Bitbucket) are used as an example SCM system for illustrative purposes. Git is a version control system used for software development and other version control tasks. A Git working directory is a repository that has complete history and revision tracking metadata and functions. It will be appreciated that the various feature and techniques described herein could, with appropriate modifications, be used with alternative SCM systems (e.g., Mercurial and Subversion).

Source code typically progresses through four stages—development, testing, staging and production. As the name suggests, in the development stage, the source code is developed and often pushed to an SCM system. Generally speaking, developers work on the source code locally, often updating it multiple times before pushing the latest updated version of the source code to the SCM system. Each source code update is called a 'commit' in Git.

Once the latest source code commit is pushed to the SCM system, it typically passes to the testing stage (either automatically in the case of CI or manually) where various tests are run on the source code to ferret out any errors or bugs in the source code. Typically, the source code is tested in all the environments (e.g., operating systems, programs, devices) it will ultimately be deployed in. Upon passing the testing phase, the source code revision enters the staging process—where the behavior of the source code is tested with realistic data. When the source code passes all these stages, it enters the production stage, also known as the live stage, where customers can interact directly with the source code.

As noted previously, continuous integration (CI) is the practice of merging working copies of source code from multiple software developers into a shared repository periodically and then using a CI management system to automatically test and/or deploy the updated source code in one or more deployment environments that correspond to three of the software development stages—testing, staging and production.

In complex and/or large computer applications, the source code is continuously being developed and updated to add new features or correct previously offered features where errors were detected. Accordingly, at any given time, hundreds if not thousands of source code revisions may be deployed in the testing, staging and/or production environments, making it is difficult for developers to know/remember which source code revision is currently in which stage of software development.

To address one or more of the above-mentioned deficiencies associated with conventional CI management, aspects of the present disclosure provide a system for tracking source code deployments. In particular, the disclosed system is configured to track deployment history for each environment. Furthermore, the presently disclosed systems are configured to generate dashboards and/or user interfaces allowing developers to review deployment history they may be interested in and view further information about each deployment.

Further still, for each deployment, the presently disclosed system may retrieve and render corresponding information from external systems, such as issue tracking systems, to supplement the existing deployment information. For example, the system may retrieve and render a list of issues (e.g., bugs and their fixes maintained by an issue tracking system such as Jira).

In certain embodiments, the presently disclosed system may also be configured to allow developers to perform actions (such as promoting a source code revision from one environment to another) directly from the generated dashboards/user interfaces. This provides greater flexibility and ease of operation.

One example CI management system in which features of the present disclosure may be implemented is Bitbucket Pipelines, which is commercially available from Atlassian. Bitbucket Pipelines is integrated with Bitbucket (Atlassian's SCM system). In the description below, Bitbucket Pipelines is used as an example CI management system and Bitbucket is used as an example SCM system for illustrative purposes. It will be appreciated that the various feature and techniques described herein could, with appropriate modifications, be used with alternative CI management systems and SCM systems (e.g., TravisCI, Wercker, Buildkite, and Jenkins) Environment Overview FIG. 1 illustrates a networked infrastructure 100 in which aspects of the present disclosure are implemented. The infrastructure 100 includes one or more client devices 102, a source code management (SCM) system 104, a CI management system 106, and a tracking system 108. In some embodiments, the networked infrastructure 100 may further include one or more external systems that include information pertaining to source code. An example of such an external system is an issue tracking system (ITS) 114 (depicted in FIG. 1). The client devices 102, SCM system 104, CI management system 106, tracking system 108 and issue tracking system 114 communicate with each other over one or more communication networks 110.

Generally, the systems depicted in FIG. 1 communicate with each other to update source code, deploy source code updates, track these deployments and render dashboards displaying information about deployments of interest to users.

In particular, the SCM system 104 stores source code repositories 112 (hereinafter referred to as repositories 112) and manages their content. It also receives/responds to requests from client devices 102 and the CI management system 106 to retrieve/store data in the repositories 112. For example, the SCM system 104 may notify the CI management system 106 when a user commits/pushes an update to source code in a repository 112. In addition, the SCM system 104 may receive a request from the CI management system 106 to access source code from a repository 112 that has recently been updated. The SCM system 104, in response, may retrieve the requested source code and forward it to the CI management system 106.

The repositories 112 may include multiple versions of source code files and associated metadata. Often a particular repository may store source code files corresponding to a particular software application and/or software development team. Typically, the SCM system 104 stores and manages multiple repositories; however, not all repositories may be registered for CI (i.e., to have their source code verified when source code is updated/revised). To differentiate the repositories registered for CI from the rest of the repositories, in one embodiment, the metadata associated with a repository includes an indicator indicating whether CI is enabled or not. The metadata of CI enabled repositories may also include a deployment descriptor, which includes, among other things, the steps for performing builds/executing deployments on the source code in different environments, and identifiers of the environments in which the source code is supposed to be built. The CI management system 106 (as described in detail below) may be configured to determine whether CI is required for a repository by inspecting the CI indicator in the metadata and, if such an indicator is present, retrieve the associated deployment descriptor.

The client devices 102 are configured to communicate with the SCM system 104, the CI management system 106, and the tracking system 108. To that end, in certain embodiments, the client devices 102 include various installed applications such as an SCM client (not shown), a CI client (not shown) and/or a tracking client (not shown).

The SCM client may be configured to create local working copies of source code; modify the working copies; commit/push changes made in the working copies to the SCM system 104 (so that the changes are written to the relevant repository 112); fetch (e.g. pull) files from a repository 112 the developer has access to; provide a user interface for reading/writing source code and deployment descriptor.

The CI client may be configured to allow communication between the client device 102 and the CI management system 106. For example, it may allow a developer to register an SCM repository 112 for CI with the CI management system 106.

The tracking client may be utilized to, for example, view/track history of source code deployments executed by the CI management system 106, promote specific source code revisions from one environment to another, view summary of source code revisions along with any issues associated with that particular revision, etc.

In certain embodiments, instead of one or more of these dedicated clients, the client device 102 simply includes a web browser client and communicates with the SCM system 104, the CI management system 106, and/or the tracking system 108 via the web browser client.

Only two client devices (102A and 102B) have been illustrated, but normal operation typically involves many more client devices connected to the various other systems in FIG. 1.

The client devices 102 may communicate with the other systems in infrastructure 100 via suitable communication networks 110. For example, the client devices 102 may communicate with the SCM system 104 via private or public networks, and with the CI management system 106 and the tracking system 108 via public networks. It will be appreciated that based on the required implementation, any suitable communication network 110 may be utilized to allow communication between the systems in environment 100.

As described in detail below, the CI management system 106 manages builds and deployments. Specifically, the CI management system 106 detects whether source code in a repository 112 that is registered for continuous integration is updated, retrieves the corresponding deployment descriptor from the repository 112, initializes one or more containers to retrieve the updated source code from the repository 112 and deploys the updated source code based on the deployment descriptor. The CI management system 106 also releases the containers once the deployment is complete.

To deploy source code in various environments, the CI management system 106 utilizes one or more computing resources. In some embodiments, the CI management system 106 communicates with a container management system (such as Amazon Web Services EC2 Container Services, Google Kubernetes, etc.) 116 to provision one or more computing resources to perform the build. Alternatively, the CI management system 106 utilizes dedicated on-premises computing resources (not shown) operatively connected to the CI management system 106.

A container management system 116 may be utilized when the CI management system 106 services a large number of clients or software development teams, constantly updating the source code they are working on. Physical on-premises devices may be utilized for lower volumes—i.e., when the CI management system 106 services a small number of clients or software development teams that update their source code infrequently.

The tracking system 108 receives/retrieves information related to source code deployments from the CI management system 106 and stores this information in a database, such as in the deployment database 118 shown in FIG. 1. Further, it is configured to forward this information to client devices 102 as and when deployment information is requested by developers and other interested parties, such as project managers, IT support, etc. The information may be communicated to the interested parties via any known communication means such as email, SMS, instant message. Alternatively, the information is made accessible on a web server, which the interested parties can access through dedicated clients or web browsers on their client devices 102.

The issue tracking system (ITS) 114 manages work items or "issues". Example ITSs include Jira and Jira Service Desk, which are commercially available from Atlassian. When implemented in a software development scenario, the work items managed by the ITS may be bugs, fixes, current software features under development, and/or features intended for further development. Accordingly, users may utilize the ITS 114 to identify one or more bugs in a particular source code revision, recommend possible solutions to identified bugs, recommend features for new versions of a source code, etc.

In order to create and progress issues in the ITS 114 users interact with appropriate user interfaces provided (e.g., by an ITS client not shown in FIG. 1). For example, a user may create a new issue and provide relevant information in respect of the issue (e.g. the unique identifier of the source code revision the issue is associated with, a description of the issue, a priority, and any other relevant information catered for). The ITS 114 itself typically generates an issue key that can be used to uniquely identify the issue, which may be hidden from or visible to the user. Once an issue has been created, a user can interact with it, for example by adding additional information to the issue (e.g. in an issue description or other field), changing the state of the issue (e.g. from in progress to resolved), assigning the issue to another person (e.g. by changing an assigned person field).

In certain embodiments, the tracking system 108 is configured to communicate with the ITS 114 to retrieve issues related to the source code deployments managed by the CI management system 106. Thereafter, the tracking system 108 may store this information in the deployment database 118 and/or communicate as a summary of issues along with deployment summary for display on a client device 102.

In FIG. 1 the SCM system 104, CI management system 106, tracking system 108, and ITS system 114 have been depicted as separate systems communicating over one or more networks 110. These systems (or their functionality) may, however, be divided over any number of physical systems communicating in any appropriate manner. By way of example, the functionality of the CI management system 106 and the tracking system 108 may be combined and hosted as a single system.

Deployment Process

Figure 2:
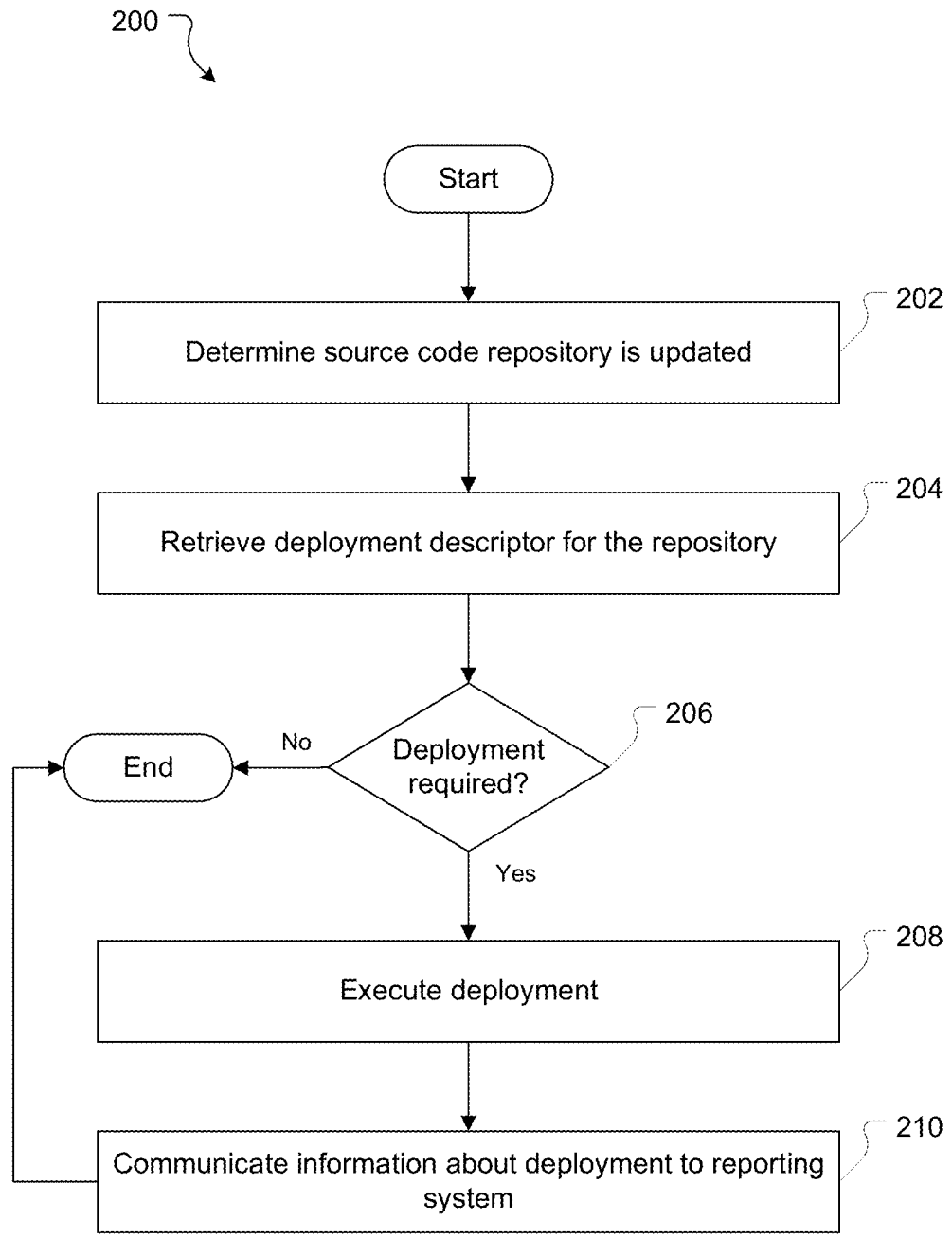
FIG. 2 is a flowchart illustrating an example method for deploying source code revisions according to some aspects of the present disclosure.

FIG. 2 is a flowchart illustrating an example method 200 for deploying source code revisions in different environments using one or more of the systems described with reference to FIG. 1. This method is described with respect to a single source code deployment. However, it will be appreciated that in actual implementation, the method is scaled to multiple deployments.

At step 202, the CI management system 106 determines that a source code repository maintained by the SCM system 104 has been updated. In certain embodiments, the CI management system 106 polls the SCM system 104 at regular intervals (e.g., every 10 minutes) to identify repositories that have been updated in that interval. In other embodiments, the CI management system 106 automatically receives source code update notifications from the SCM system 104 when a repository is updated, e.g., because a user has pushed anew source code revision to the repository or has manually requested that a particular source code revision be deployed.

A notification, polled for or automatically received, may be communicated as an event descriptor to the CI management system 106. The event descriptor includes information about the repository 112 where the change originated (e.g., a repository ID, a repository name, a repository type, and/or a repository URL), a unique identifier for the source code revision (commonly referred to as a commit ID), a list of changes made to the source code between the previous update and this update, and the names of author(s) and/or user(s) that made the changes.

In SCM systems, branching is a technique whereby developers can diverge from the main line of source code development and continue to update source code without affecting the source code in the main line/branch (often called master in Git-based systems). When a source code update is pushed/committed to a branch, the event descriptor also includes an identifier for the branch on which the source code was pushed.

An example event descriptor is illustrated in Table A below. Although a table has been used to illustrate information received in the event descriptor, the relevant information need not be received in a table and could be received in any appropriate format (e.g. a simple text file, a JSON file, an XML file).

TABLE A

Example event descriptor

| | |
|---|---|
| Repository ID | 347abcef38764 |
| Repository Name | John_Doe/bamboo-bootcamp |
| Repository URL | https://api.bitbucket.org/2.0/repositories/John_Doe/bamboo-bootcamp |
| Author | John Doe |
| Branch | master |
| CommitID | 7a273a067efbf16ec83d885ad79a7a626f2eec3f |
| Changes | ```
{
    "forced": false,
    "old": {
      "links": {
        "commits": {
          "href": "https://api.bitbucket.org/2.0/repositories/Jdoe/demo2/commits/master"
        },
        "self": {
          "href": "https://api.bitbucket.org/2.0/repositories/Jdoe/demo2/refs/branches/master"
        },
        "html": {
          "href": "https://bitbucket.org/Jdoe/demo2/branch/master"
        }
      },
      "type": "branch",
      "target": {
        "hash": "3c62dce565729e8dda3651557d86be6380a03445",
        "links": {
          "self": {
            "href": "https://api.bitbucket.org/2.0/repositories/Jdoe/demo2/commit/3c62dce565729e8dda3651557d86be6380a03445"
          },
          "html": {
            "href": "https://bitbucket.org/Jdoe/demo2/commits/3c62dce565729e8dda3651557d86be6380a03445"
          }
        },
        "author": {
          "raw": "John Doe",
          "user": {
            "username": "Jdoe23",
            "type": "user",
            "uuid": "{39846whedwqh49873}",
          }
        }
      },
``` |

In certain embodiments, the SCM system 104 communicates the event descriptor via a webhook—an HTTP POST callback that creates and passes the event descriptor to the CI management system 106 when a corresponding repository is updated. For this to work, webhooks are created for the repositories 112 registered for CI.

Once an event descriptor that corresponds to a repository for which CI is required is received, the CI management system 106 retrieves the deployment descriptor for the repository at step 204. In certain embodiments, the deployment descriptor may be stored in the SCM repository 112 along with the source code, whereas in other embodiments, the deployment descriptor may be stored in the CI management system 106. Accordingly, depending on the particular embodiment, the CI management system 106 retrieves the deployment descriptor from the corresponding SCM repository 112 or from memory associated with the CI management system 106.

Generally speaking, the deployment descriptor corresponding to a particular repository includes instructions for deploying source code revisions from that repository 112 in one or more environments. Further, in some cases, the deployment descriptor may include different sets of deployment instructions for different source code branches. For example, if a repository includes a master branch and a testing branch, the deployment descriptor may include one set of instructions for deploying source code revisions committed to the master branch and another set of instructions for deploying source code revisions committed to the testing branch.

Further still, the deployment descriptor may include a different set of instructions for deploying source code revisions that are manually selected by a developer for a custom deployment.

It will be appreciated that these are merely examples and that in some cases the deployment descriptor may include a single set of instructions for deploying source code revisions committed/pushed on any branch and/or manually selected.

A set of deployment instructions may include the name of one or more repository branches for testing and steps for executing the deployment for each branch. The steps include commands for executing the deployment and settings of a container in which the source code is supposed to be deployed.

In addition, for each step, the deployment descriptor may include a step name, a container image of the container required for the deployment, a trigger, a deployment environment, a script, and/or an artifact. Table B illustrates an example deployment descriptor.

TABLE B

| Deployment descriptor | |
|---|---|
| Build configuration | Default |
| *Step 1* | |
| Name: | Build and test |
| Image: | node: 8.5.0 |
| deployment | testing |
| Script: | npm install |
| | npm test |
| | npm build |
| Artifacts | "dist/**" |
| *Step 2* | |
| Name: | Deploy to staging |
| Image: | Python: 3.5.1 |
| Deployment: | staging |
| Trigger: | manual |
| Script: | python deploy.py staging |
| *Step 3* | |
| Name: | Deploy to production |
| Image: | Python: 3.5.1 |
| Trigger: | manual |
| Deployment: | production |
| Script: | python deply.py prod |

In the above example, the deployment descriptor includes the following information:

A deployment configuration. In this example, the deployment configuration is 'default' which means that the steps for this configuration are executed for all commits (or source code revisions pushed to the SCM system 104) for that repository, unless the commit is for a particular branch or is manually selected. In other examples, the build configuration may point to a particular 'branch', in which case the steps are executed when a source code revision is committed to the defined branch. Alternatively, this field could be 'custom', in which case the steps are executed when a source code revision is manually selected for deployment (e.g., via the web interface).

Steps, which define the commands executed and settings of containers in which the source code is to be built. Each step may further include the following fields:

Name, which defines what the step is doing. This field is usually displayed by the tracking system 108 and therefore is usually something that developers can easily understand.

Image: this specifies the container image (e.g., Docker image) to be used for executing a particular step. If an image is not specified, a default image may be used.

Trigger: this specifies whether a particular step is manual or automatic—i.e., whether the CI management system 106 should automatically run the step or wait for approval.

Deployment: defines the type of environment for the deployment (e.g., testing, staging or production).

Script: this field contains a list of commands that are executed to perform the build.

Artifacts: this field defines files that are produced by a particular step, such as reports, clean copies of the source code, and/or result files that are to be shared with the next step in the build configuration.

Although the deployment descriptor is illustrated in a table, the relevant information need not be stored in a table and could be stored in any appropriate format (e.g. a text file such as YAML file).

To retrieve data, such as the deployment descriptor and source code, from the SCM repository 104, the CI management system 106 may negotiate permissions with the SCM system 104. For example, when a user first registers their repository for CI, the user authorizes the CI management system 106 to retrieve information such as source code and deployment descriptor from the SCM repository without the need for explicit permissions when the CI management system 106 requires this information. This authorization may be done using any commonly known authorization/permissions techniques or standards, such as OAuth.

According to the OAuth standard, the CI enabled repositories 112 share secrets with the CI management system 106. Based on these secrets, the CI management system 106 generates authorization tokens when it executes a deployment for a repository. The tokens may be valid for the deployment duration and may expire once the deployment is complete.

Thus, using an authorization token, the CI management system 106 can access the SCM repository 112 identified in the event descriptor and retrieve the deployment descriptor.

In some embodiments, the deployment descriptor is temporarily stored in the CI management system 106 to be utilized during the deployment. Once the deployment is completed, the deployment descriptor is discarded. Alternatively, they are stored in the CI management system 106 for future deployments.

Returning to FIG. 2, at step 206, the CI management system 106 determines whether deployment is required. To this end, the CI management system 106 compares the source code revision information provided in the event descriptor with the build configuration information in the deployment descriptor. In particular, it may compare the identifier of the branch onto which the source code revision was pushed with the build configuration field in the deployment descriptor.

If the comparison results in a negative—e.g., if the branch identifier in the event descriptor does not match the branch identifier in the deployment descriptor or there is no default build configuration in the deployment descriptor, the CI management system 106 may determine that there is no need for deployment and the method 200 ends.

Alternatively, if the comparison results in a positive—e.g., if the branch identifier in the event descriptor matches the branch identifier in the deployment descriptor or there is a default build configuration in the deployment descriptor, the CI management system 106 may determine that the source code revision needs to be deployed and the method 200 proceeds to step 208 where the CI management system 106 executes one or more steps in the deployment descriptor.

In order to execute the deployment, the CI management system 106 generates a deployment request. The deployment request may be created based on the event descriptor and deployment descriptor. Largely, the deployment request includes an identifier that uniquely identifies the current deployment, authorization tokens for accessing a repository (i.e., the repository identified in the event descriptor), and a field indicating the deployment environment (e.g., testing, staging or production). The deployment request may further include a repository identifier, an image identifier, and a commit identifier. In some embodiments, the deployment request may further include a field indicating the steps that are to be performed during the deployment.

Table C illustrates an example deployment request below. Although a table has been used to illustrate this information, the relevant information need not be stored in a table and could be stored in any appropriate format (e.g. a simple text file, a JSON file, an XML file, etc.).

TABLE C

| deployment request | |
|---|---|
| Deployment ID | 8374 |
| Auth-token | fd4jw4908343943 |
| Deployment | Staging |
| Repository ID | 347abcef38764 |
| Commit ID | fd78cd23 |
| Image | Node: 8.5.0 |
| Script | Python deply.py staging |

In the above example, the deployment request includes the following information:
  A unique deployment ID associated with that deployment request.
  An Auth-token for accessing the repository in which the source code revision is stored.
  The environment to which the deployment is being made ('Deployment')
  Repository identifier of the repository where the source code revision is stored.
  The Commit ID of the commit that was pushed or manually selected for which the deployment is to be executed
  Build steps ('Script') retrieved from the deployment descriptor that include the commands for executing that particular deployment.

The CI system 106 retrieves some of the required information, such as the repository ID from the event descriptors and the build steps from the deployment descriptor. Other information (such as the deployment identifier and the authorization token) may be generated by the CI management system 106. Once a deployment request is created, it is queued for execution.

Next, the CI management system 106 retrieves the queued deployment request and executes it. Typically this is done by launching a container, retrieving the source code revision from the SCM system 104, executing the build steps, capturing the output of the deployment and deleting the container.

Upon commencing the execution of the deployment, the CI management system 106 is configured to update the status of the deployment based on the result. It is configured to communicate information about the deployment to the tracking system 108 at step 210. In certain embodiments, this information may include the deployment ID, the corresponding commit ID, repository ID, an identifier of the user that requested the deployment (e.g., either by pushing the source code revision into the SCM repository or by manually selecting a particular source code revision for deployment), the date and time the deployment was executed, the environment in which the source code revision was deployed, and status of the deployment (e.g., "in progress"). The CI management system 106 then updates the status once the deployment is complete (to "success" of "failed" for instance). Status of the deployment includes, e.g., whether the deployment is queued/pending, in progress, completed, successful or unsuccessful. When the deployment request is first created, the status of the deployment is set as queued/pending. This status is updated during the deployment process. For example, when the deployment is initiated, the status is updated to 'in progress' and once it is completed the status may be updated to 'completed', 'successful' or 'unsuccessful' (depending on the outcome of the deployment).

Information about the deployment may be forwarded to the tracking system 108 in the form of a tracking descriptor. Table D illustrates an example deployment tracking descriptor below. Although a table has been used to illustrate information stored in the deployment tracking descriptor, the relevant information need not be stored in a table and could be stored in any appropriate format (e.g. a simple text file, a JSON file, an XML file, etc.).

TABLE D

| tracking descriptor | |
|---|---|
| Deployment ID | 8374 |
| Repository ID | 347kdsfjh38764 |
| Commit ID | 7a273a067efbf16ec83d885ad79a7a626f2eec3f |
| User ID | John_Doe |
| Date | 19 June 2018 09:06:30 |
| Environment | testing |
| Status | in progress |

The CI management system 106 may retrieve some of the required information for this descriptor, such as the repository ID, commit ID, and user ID from the event descriptor. Other information such as the deployment ID is retrieved from the deployment request and the date and environment may be retrieved once the deployment is completed. Further, the status of the deployment from the CI management system 106

The tracking system 108 stores the information received in the tracking descriptor in the deployment database 118 at step 212 to be used when information about the deployment is requested.

Tracking and Reporting Process

Figure 3A:
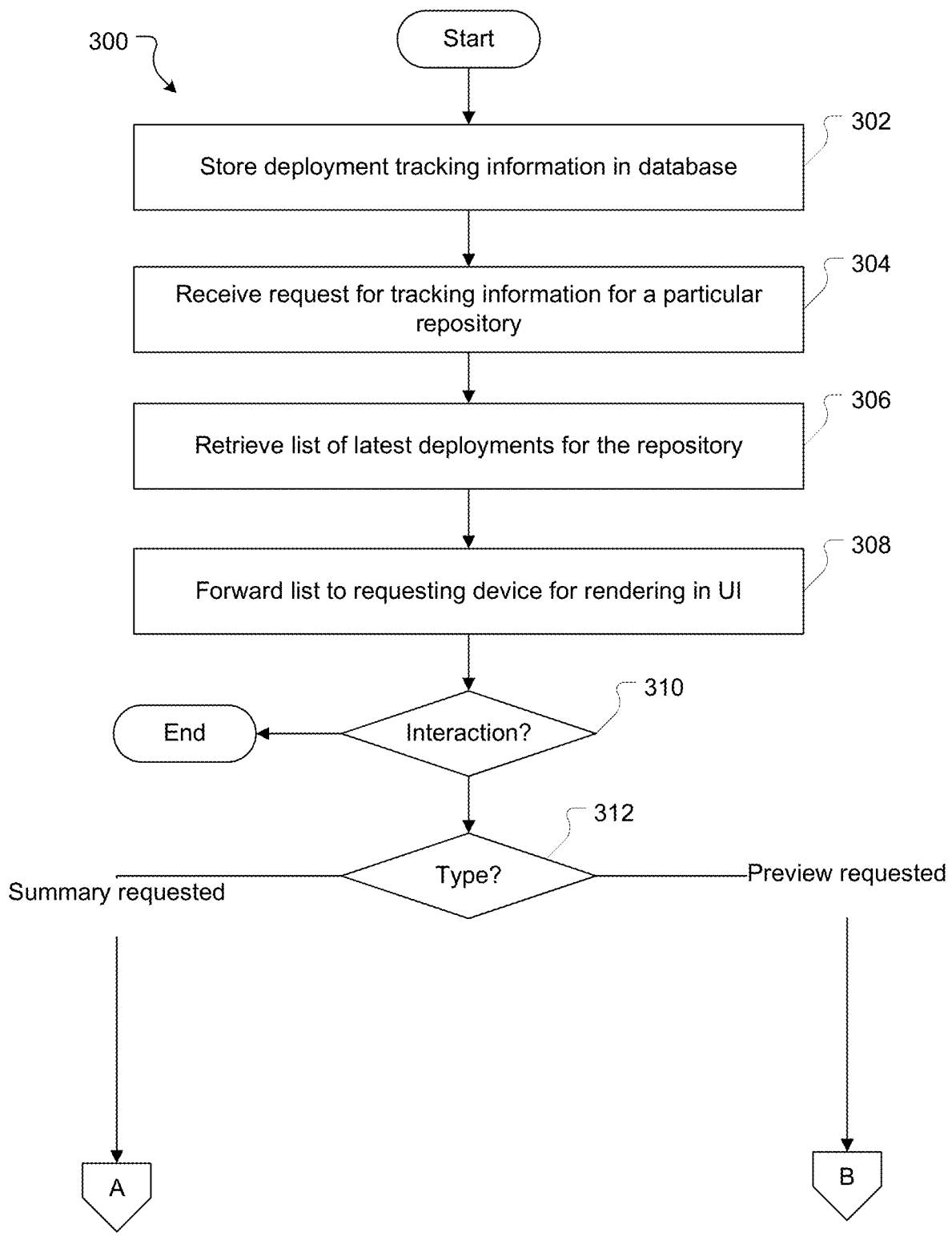
FIG. 3A is a flowchart illustrating an example method for tracking deployments according to some aspects of the present disclosure.
Figure 3B:
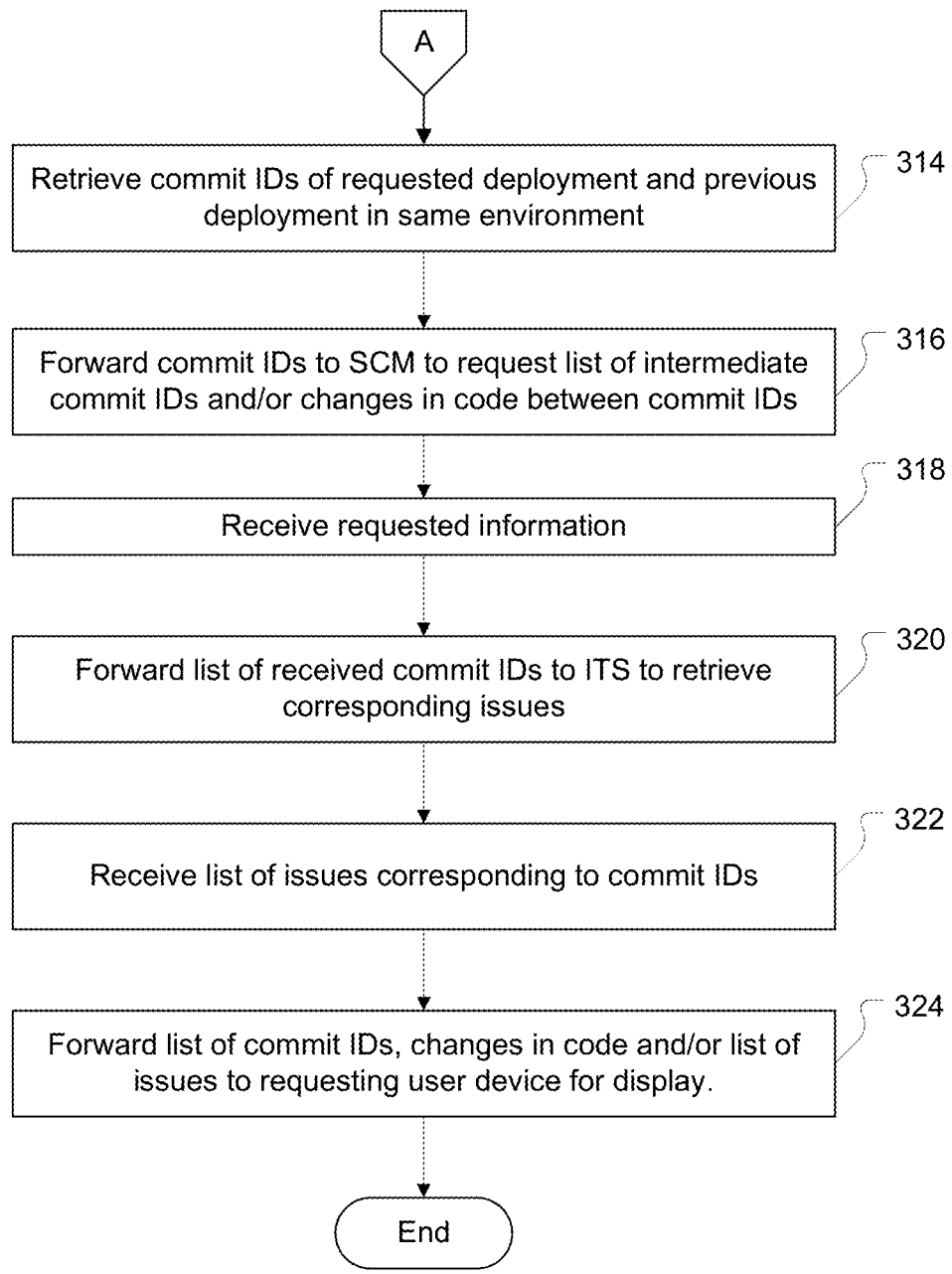
FIG. 3B is a flowchart illustrating an example method for tracking deployments according to some aspects of the present disclosure.
Figure 3C:
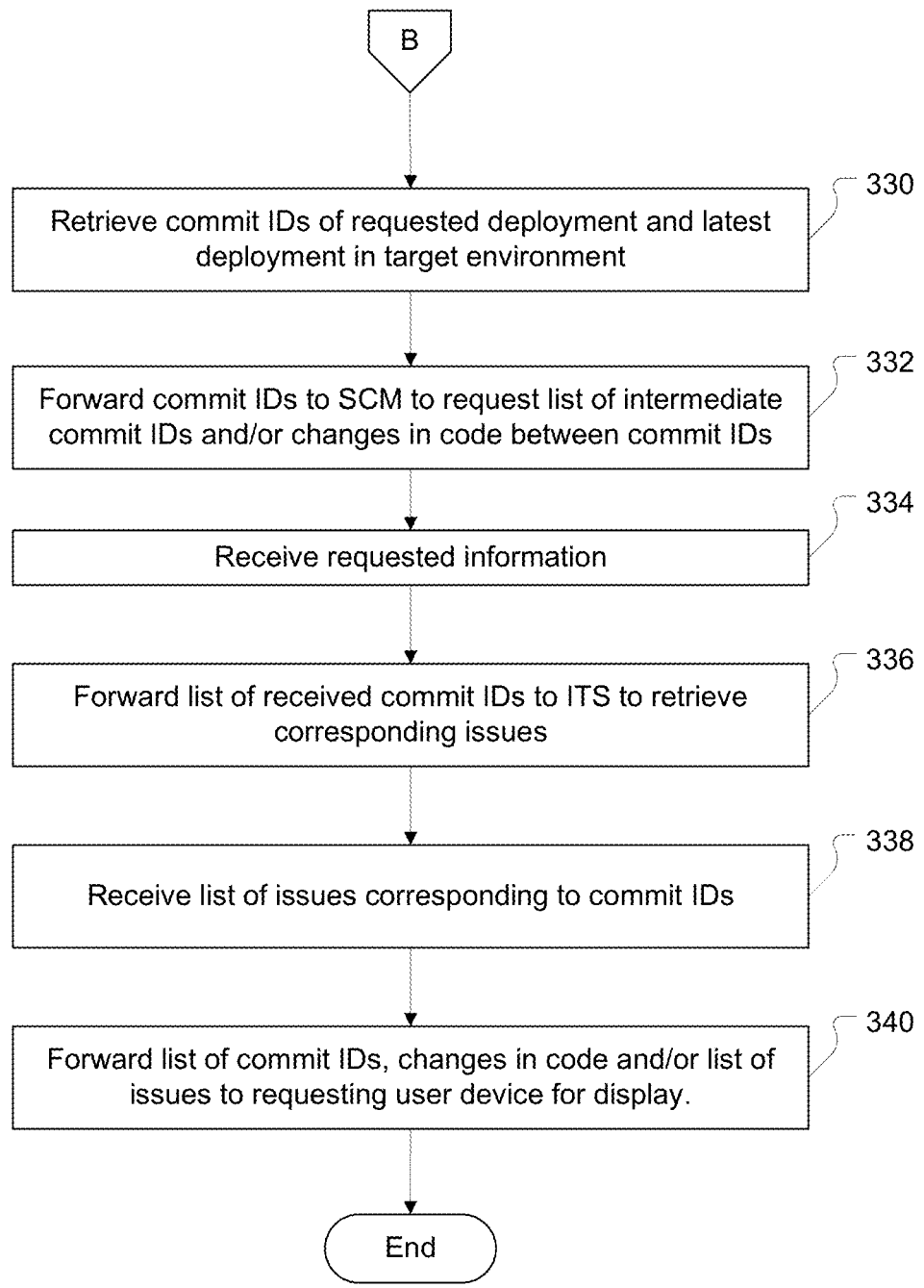
FIG. 3C is a flowchart illustrating an example method for tracking deployments according to some aspects of the present disclosure.

FIGS. 3A-3C illustrate an example method 300 for generating tracking information for deployments. Tracking information may be generated in any particular manner. However, in this example, the tracking information is generated per repository allowing users to track deployments related to their repository.

FIGS. 3A-3C illustrate an end-to-end method for generating and rendering tracking information. Although the process is described as a continuous process, it can be segmented into smaller processes that run at different times/stages. For example, steps 302 may be carried out at one stage, steps 304-308 at another stage, whereas steps 310-324 may be carried out at yet another stage, and steps 330-340 may be carried out at a different time lapsed stage.

The method 300 begins at step 302, where the tracking system 108 stores deployment tracking information in the deployment database 118. To this end, the tracking system 108 first receives deployment information from the CI management system 106. In some embodiments, the CI management system 106 may be configured to provide this information in the form of tracking descriptors (see table D) to the tracking system 108 whenever deployments are completed. In other cases, the tracking system 108 may be configured to poll the CI management system 106 periodically to determine if any deployments have completed.

In any case, the tracking system 108 receives deployment information for executed deployments from the CI management system 106. This information is stored in the deployment database 118.

An example of a data structure storing deployment information is illustrated in table E below. Although a table is used to illustrate the data structure, the relevant information need not be stored in a table and could be stored in any appropriate format.

TABLE E example tracking information data structure

| Deployment ID | Build No. | Commit ID | Repository ID | Name | Date | User ID | Environment |
|---|---|---|---|---|---|---|---|
| ... | ... | ... | ... | ... | ... | ... | ... |
| 333 | 101 | 7778e48 | 347kdsfjh3876 | Build and test | 19 Jun. 2018 | John_Doe | Testing |
| 302 | 38 | 3846hfd | 4478frhjksdf8 | Deploy to staging | 18 Jun. 2018 | Jane_Deer | Staging |
| 298 | 100 | F89dsh4 | 347kdsfjh3876 | Add Bitbucket client repo to submodules | 3 Jun. 2018 | Suzie_Mclean | Production |
| 297 | 37 | 58973hf | 4478frhjksdf8 | Update Docker compose to remove breaking code | 3 Jun. 2018 | Ryan_gosming | Testing |
| 288 | 100 | F89dsh4 | 347kdsfjh3876 | Add Bitbucket client repo to submodules | 27 May 2018 | Suzie_Mclean | Staging |
| ... | ... | ... | ... | ... | ... | ... | ... |

It will be appreciated that a particular deployment may include multiple steps—such as 'deploy to test' and if successful 'deploy to staging'. The deployment in each stage may be stored as a separate record in the database 118 with its own unique deployment ID. 'Build number' on the other hand may correspond to a particular deployment and therefore may be the same for different steps. In the example above, the database stores two deployments with IDs 298 and 288 for the same source code revision and repository. In this case, although the deployment IDs are different, the build numbers are the same.

Next, at step 304, a request for tracking information is received from a client device 102. The request may be generated when a developer at a client device 102 requests to see a summary of their deployments. For example, the user may open the CI management client or the tracking client on their client device 102. This action causes the client device 102 to generate and forward a tracking information request to the tracking system 108. The tracking information typically includes information required by the tracking system 108 to service the request and may vary depending on the type of request. At the very least, it includes an identifier of the repository associated with the developer. In addition to this, it may include other information. For example, if the user wishes to view deployments in a particular environment or just view the most recent deployments in each environment, the tracking information request may further include the environment ID of the environment the user wishes to view or a limit on the number of deployments to retrieve from each environment.

Using this identifier, at step 306, the reporting module 108 retrieves a list of latest deployments for that repository from the deployment database 118. The number of deployments retrieved in the list may be configurable. For example, the tracking information request may include a field indicating the number of requested records (e.g., 20 latest deployments) for that repository.

Figure 4:
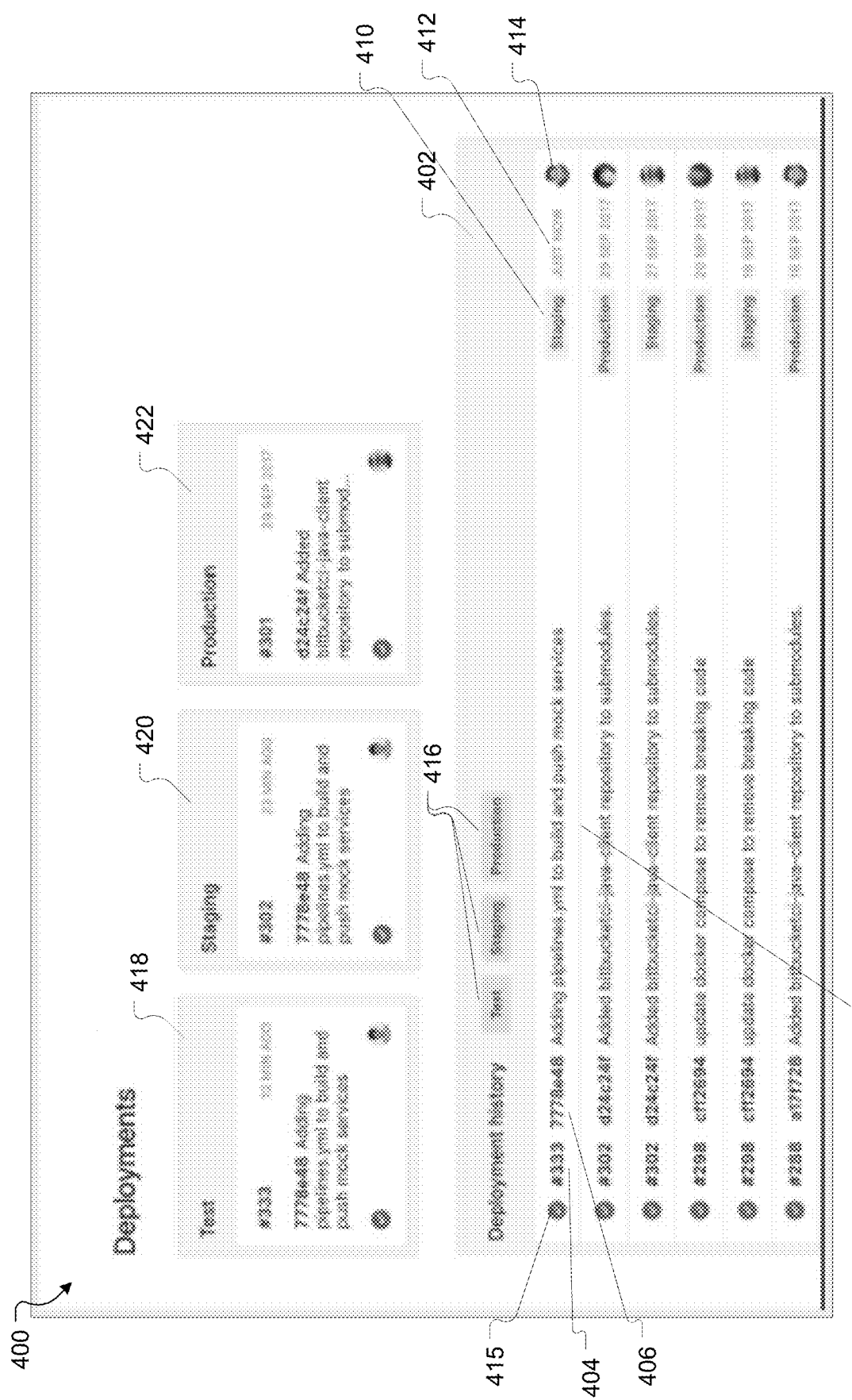
FIG. 4 is an example deployment summary dashboard.

At step 308, this list of records is forwarded to the requesting client device 102 for rendering on a display of the client device. FIG. 4 illustrates an example dashboard 400 rendered by a client application (e.g., tracking client) on the client device 102. Generally speaking, the dashboard 400 includes a summary of the latest deployments in the repository associated with the user accessing the dashboard 400. In particular, in this example, the dashboard 400 includes a deployment history section 402, which includes information about the latest deployments (arranged in date order such that the latest deployment is displayed on top). Each row in the history section 402 may display information about a particular deployment including the deployment identifier 404, the commit ID 406, a description 408, the environment in which it was deployed 410, date of the deployment 412, and an identifier of the user 414 that caused the deployment. Status 415 of each deployment (e.g., completed or in-progress) may also be displayed in the history section 402.

The dashboard 400 further includes one or more filtering controls 416 to filter the deployments based on one or more information fields of the deployments, such as the environment, date range, the author, etc. This allows the developer to view selected deployments, for example, deployments pertaining to a particular environment, deployments triggered by a particular user 414, deployments made within a certain date range, etc. FIG. 4 illustrates three filtering controls, 'test', 'staging' and 'production' to filter deployment history based on deployment environments.

Further, the dashboard 400 may include a section showing the latest deployment in each environment. In FIG. 4 this is displayed in the form of user interface cards 418, 420 and 422.

A developer can interact with the dashboard 400 to perform one or more actions. For example, the developer may further drill down in the deployment history to obtain more information about any particular deployment. Alternatively, the developer may request a preview before promoting a particular deployment from one environment to another.

At step 310 the reporting module 108 determines whether the developer has interacted with the dashboard 400 to perform one or more actions. This determination may be made, for example, if the reporting module 108 receives a request for further information from the client device 102. If a request is received, the reporting module 108 determines that the user has interacted with the dashboard and the method proceeds to step 312.

At step 312 the type of interaction is identified. For example, the tracking system 108 determines whether the interaction corresponds to a request for information on a particular deployment from the history section 402, or if the interaction corresponds to a request to preview a particular deployment the developer may be considering. The following sections describe the method steps performed by the tracking system 108 for each of these types of requests.

Review Specific Deployment Information

If it is determined that the interaction corresponds to a request for information on a particular deployment—e.g., if a developer selects a particular deployment from the history section, and the received request includes one or more identifiers identifying the particular deployment and the environment for which additional information is requested, the method proceeds to step 314.

At this stage, the tracking system 108 may collect further information about the deployment from external systems (e.g., the SCM system 104 and/or the ITS 114). For example, it may retrieve a list of source code revisions that exist between two deployments and/or changes in the source code between the two deployments from the SCM system 104.

As described previously, developers usually work locally on their source code and may update source code locally in the SCM client multiple times (by 'committing' the source code locally) before 'pushing' the source code to the SCM system 104. Similarly, developers may commit a number of updates to the source code on a particular branch, e.g., a development branch, before pushing the updates onto the master branch (which is the branch on which deployments are executed). Accordingly, there may be a number of undeployed source code revisions between two deployed source code revisions.

At step 314, the tracking system 108 retrieves information about these undeployed source code revisions from the SCM system 104. To this end, the tracking system retrieves the commit IDs corresponding to the deployment selected by the developer and the deployment that immediately precedes that deployment. For example, in the deployment history shown in FIG. 4, if the user selects deployment number '333', the tracking system 108 retrieves the commit ID corresponding to that deployment number—i.e., commit ID 7778e48. It also identifies the immediately preceding deployment in the same environment (i.e., the staging environment)—i.e., deployment number 302 and retrieves the commit ID corresponding to that deployment—i.e., commit ID d24c24f.

At step 316, the reporting module 108 requests the SCM system 104 to provide a list of commit IDs corresponding to source code revisions that exist between the two commit IDs. Further, it may request the SCM system 104 to provide a list of changes in the source code that occurred between the two commit IDs.

The requested information (i.e., the list of commit IDs and/or the changes in source code between the two commit IDs) is received at the tracking system 108 at step 318.

Next, in certain embodiments, where the platform 100 includes an ITS 114 for managing issues related to software development, the tracking system 108 requests the ITS 114 to forward one or more issues related to the commit IDs received at step 318 and/or related to the commit IDs forwarded to the SCM at step 316. The request includes the list of commit IDs.

The ITS 114 compares the list of commit IDs with commit IDs of issues managed by the ITS 114 (e.g., by performing a lookup of the commit IDs in a commit ID field of the issues maintained by the ITS 114).

If the ITS 114 identifies any issues corresponding to the received commit IDs, it forwards a summary of the identified issues to the tracking system 108, which at step 322, receives the summary of the issues. The summary may include, for example, a description of the issue, status of the issue (resolved, pending, etc.), author of the issue, the related commit ID, and any other such relevant information.

At step 324, the information received from the external source (e.g., the list of commit IDs, updates to the source code between the two deployments, and/or the issues associated with the source code between the two deployments) is forwarded to the client device 102 for rendering.

Figure 5:
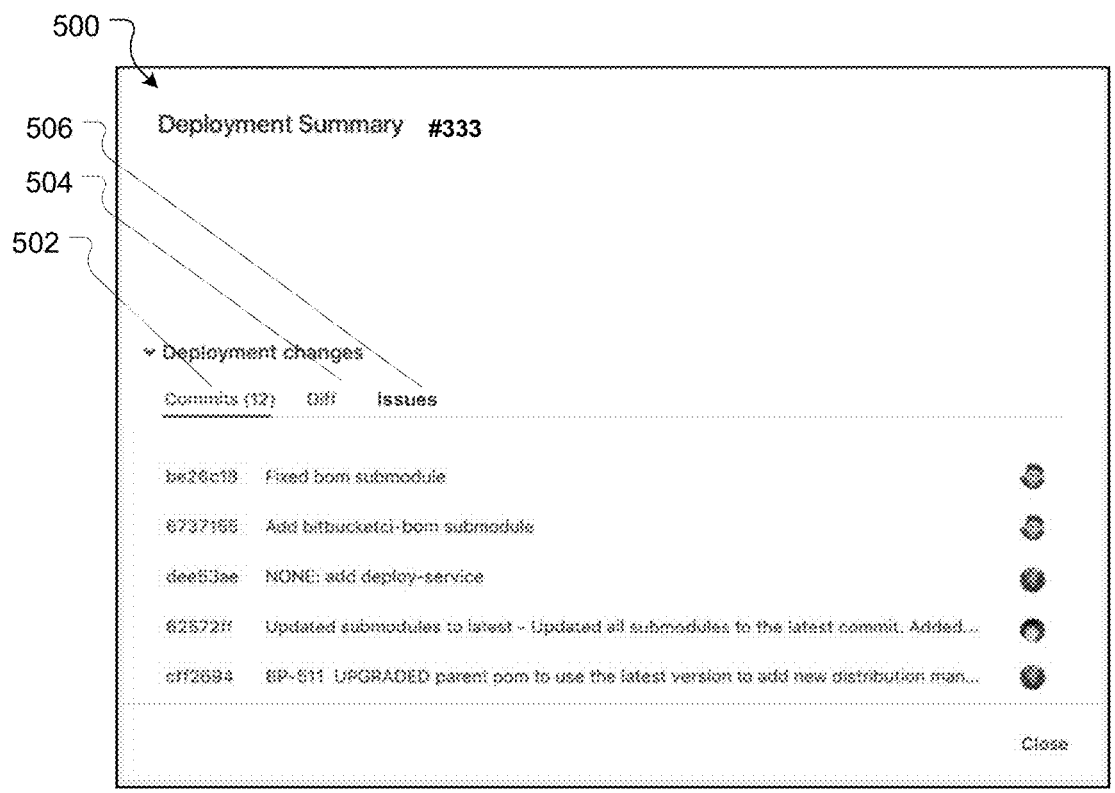
FIG. 5 is an example user interface displaying information about a particular deployment that has been executed.

FIG. 5 is a screenshot illustrating an example user interface (UI) 500 including a number of tabs 502, 504, and 506, each displaying a different aspect of the particular deployment (i.e., deployment number 333). Tab 502 illustrates a list of commits (12 in this case) between deployments 333 and 302 in the staging environment. In addition to the commit ID, the tab 502 displays a name/description of the commit and the author of the commit.

The developer may toggle between tabs 502-506 to change the displayed information. For instance, if tab 504 is selected, differences in source code between the two deployments may be displayed and if tab 506 is selected, a summary of the issues related to any of the commit ID between deployments 333 and 302 may be displayed.

Preview Deployment Before Promotion

Returning to FIG. 3, if at step 312, it is determined that the interaction corresponds to a preview before promoting a particular deployment from one environment to another—e.g., promoting deployment number 333 from the staging environment to the production environment, and the received request includes one or more identifiers identifying the particular deployment and environment to which promotion is requested, the method proceeds to step 330.

At step 330, the tracking system 108 retrieves the commit ID corresponding to the deployment selected by the developer for promotion and the commit ID of the latest deployment in the target environment in which the developer wishes to promote the selected deployment. For example, if the developer selects deployment number '333' for promotion from the staging to the production environment, the tracking system 108 retrieves the commit ID corresponding to that deployment number—i.e., commit ID 7778e48. It also identifies the latest deployment in the production environment, i.e., deployment number 302 and retrieves the commit ID corresponding to that deployment—i.e., commit ID d24c24f.

Steps 332-340 are similar to steps 316-322 and therefore are not described in detail. At step 332, the reporting module 108 requests the SCM system 104 to provide a list of commit IDs corresponding to the undeployed source code revisions that exist between the two commit IDs. Further, it may request the SCM system 104 to provide a list of changes in the source code that occurred between the two commit IDs.

The requested information (i.e., the list of commit IDs and/or the changes in source code between the two commit IDs) is received at the tracking system 108 at step 334.

Next, the tracking system 108 requests the ITS 114 to forward one or more issues related to the commit IDs received at step 334 and/or related to the commit IDs forwarded to the SCM at step 332. The request includes the list of commit IDs.

If the ITS 114 identifies any issues related to the list of commit IDs, at step 338, the reporting module receives a summary of the identified issues.

At step 340, the information received from the external sources (e.g., the list of commit IDs, updates to the source code between the two deployments, and the issues associated with the source code between the two deployments) is forwarded to the client device 102 for rendering.

Figure 6:
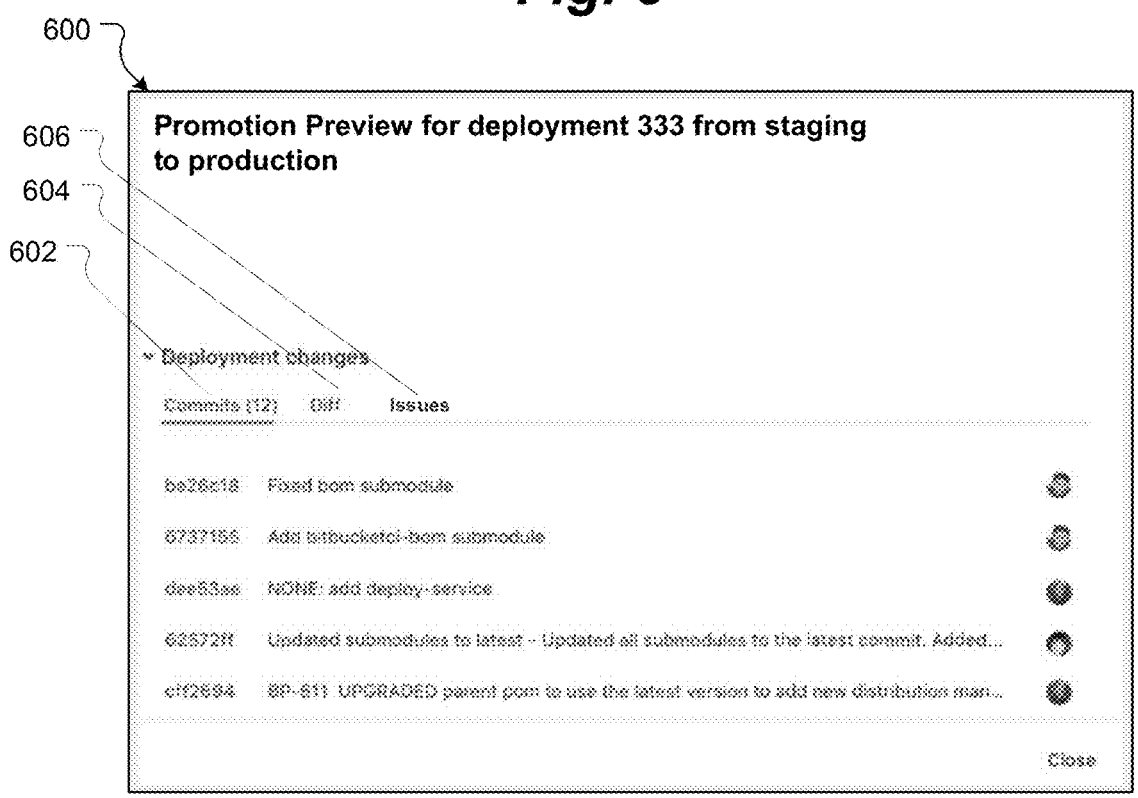
FIG. 6 is an example user interface displaying preview information about a particular deployment.

FIG. 6 is a screenshot illustrating an example UI 600 for displaying a preview summary for the selected deployment. In this example UI 600, this information is displayed in a number of tabs 602, 604, and 606—each displaying a different preview aspect of the particular deployment (i.e., deployment number 333). Tab 602 illustrates a list of commits (12 in this case) between the latest deployments in the production environment (i.e., deployment 302) and the selected deployment for promotion (i.e., deployment 333). In addition to the commit ID, the tab 602 displays a name/description of the commit and the author of the commit. It will be appreciated that this information is retrieved by the reporting module 108 from the SCM system 104 at step 334.

The developer may toggle between tabs 602-606 to change the displayed information. For instance, if tab 604 is selected, differences in source code between the two deployments may be displayed and if tab 606 is selected, a summary of the issues related to any of the commit ID between deployments 333 and 302 may be displayed. This way a developer is made aware of the issues that may arise if that particular source code revision is promoted to the next development stage.

The description above assumes that a build has already been deployed to one environment. However, previews may also be possible before a build has been deployed to any environment. For example, the instructions for deploying source code from a particular repository may include executing a script that generates an artifact as a first step and any other steps after that first step may be set to manual execution. In this case, a developer may request to see a preview before deploying the build in a first environment.

Promoting Deployments Process

As previously mentioned, a source code revision progresses through different deployment environments—testing, staging and production. In some cases, this progression is automatic—e.g., if the source code revision is successfully built and deployed in one environment and the trigger field in the deployment descriptor is set to 'automatic'. In other cases, where, e.g., the CI management system 106 does not manage to successfully build or deploy the source code revision in a particular environment or the trigger field in the deployment descriptor is set to 'manual', the source code revision does not automatically progress though the different environments. In these cases, one or more users typically approve promotion of the source code revision from one environment to the next manually.

According to aspects of the present disclosure, the CI management system 106 is configured to automatically determine which source code revisions are ready for promotion and provide this information to the tracking system 108 for notifying associated developers/approvers.

Figure 7:
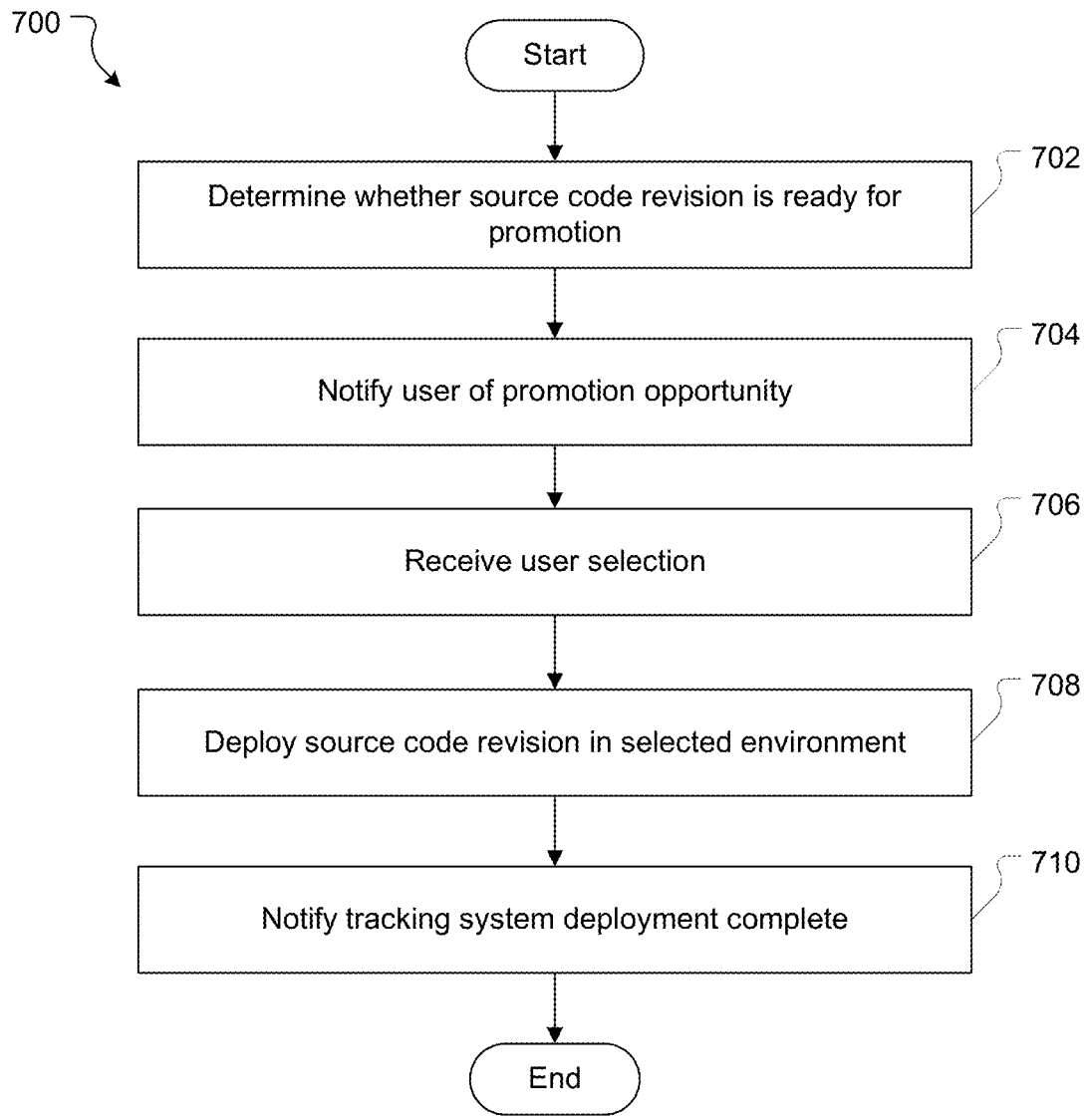
FIG. 7 is a flowchart illustrating an example method for promoting a source code revision from one environment to another.

FIG. 7 illustrates an example method 700 for promoting a deployment according to some aspects of the present disclosure. The method begins at step 702, where the CI management system 106 determines whether a source code revision is ready to be promoted to the next environment.

Typically, if a build descriptor includes multiple steps, once a step is completed, the CI management system creates a new deployment request and tracking descriptor for the next step (with a status of 'pending/queued) and queues the deployment request for execution. For automatic deployments, the CI management system 106 automatically initiates deployment once the request is at the head of the queue. In this case, once deployment has commenced, the status of the deployment is updated in the tracking descriptor to "in progress". But, in case of manual deployments the status of the tracking descriptor remains 'queued/pending' state and the deployment request is not executed until explicit instructions are received.

In certain embodiments, the CI management system 106 determines that a source code revision is ready to be promoted based on the 'queued/pending' status of the tracking descriptors and their associated trigger values.

If a source code revision is identified at step 702, the method proceeds to step 704, where a user is notified that that a particular source code revision is ready for promotion. To this end, the CI management system 106 may notify the tracking system 108 of the source code revision ready for promotion. This notification may include the repository identifier, the deployment identifier (and/or the build number), commit ID, and environment identifier. The tracking system 108, in turn, forwards this notification to one or more client applications that are associated with users who have permission to approve the deployment. In some cases, not all developers associated with a given software application may have permission to deploy a corresponding build. In other cases, some developers may only have permission to deploy in certain environments (e.g., testing), but not other environments (e.g., production). The permissions can be set globally for all deployments or they can be set individually for each environment such that different developers have different sets of permissions in different environments. These permissions may be stored in the CI management system and/or the SCM system 104. Accordingly, in some cases, to identify the correct users, the tracking system 108 requests this the CI management system 106 and/or the SCM system 104 for a list of users that have permission to promote builds for that particular repository to the environment in which the build is ready to be deployed.

Subsequently, at step 706, the CI management system 106 receives a notification from the client device 102 informing the CI management system 106 that a user has selected the source code revision for promotion from one environment to the next. As a prerequisite to this step, the client device 102 performs a number of operations. For example, it displays an option to select a particular source code revision for promotion, receives a user selection for the promotion, and forwards this to the tracking system 108, which in turn, forwards this to the CI management system 106.

Figure 8:
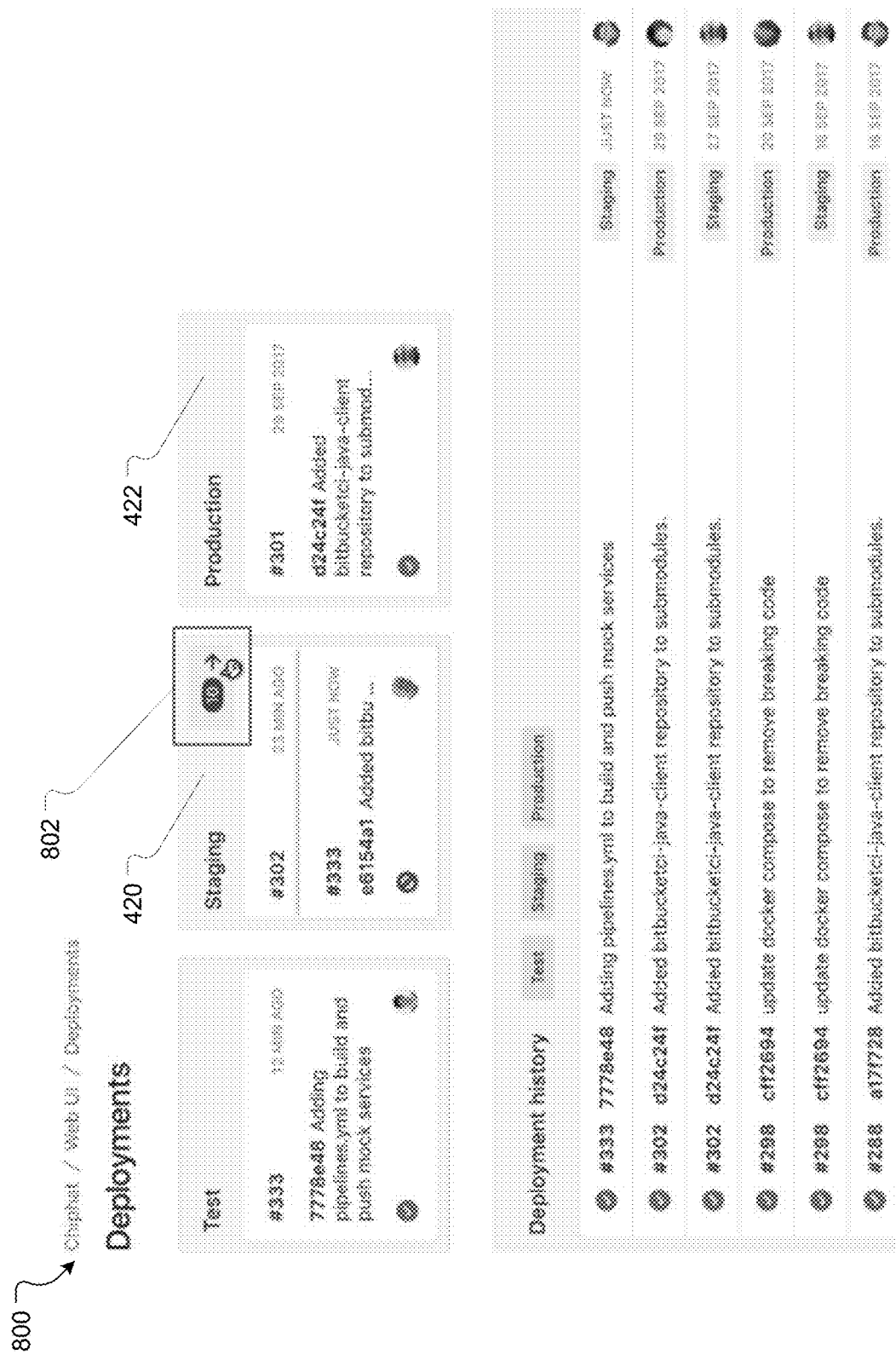
FIG. 8 is an example deployment summary dashboard with promotion information.

In certain embodiments, the client application may present an option for promoting source code revisions on a deployment summary dashboard (e.g., the dashboard 400). FIG. 8 illustrates an example summary dashboard 800 rendered by a client application in response to receiving the promotion notification. As seen in this figure, all other aspects of the summary dashboard 800 are similar to those described with respect to summary dashboard 400 except for the staging card 420. In FIG. 8, the staging card 420 includes an interactive control 802 indicating that there is a deployment in the staging environment that can be promoted to the production environment. Further, it is apparent from the staging card 420 and the production card 422 that deployment number 302 was successfully built in the staging environment and the latest deployment in the production environment is deployment number 301, so deployment 302 can be promoted to the production environment.

If the developer selects the option to promote a source code revision to the next environment from dashboard 800, e.g., by selecting the interactive control 802, the client application is configured to render a further UI providing information about the promotion or requesting the user to confirm the promotion. In this disclosure, this UI is referred to as a promotion UI.

Figure 9:
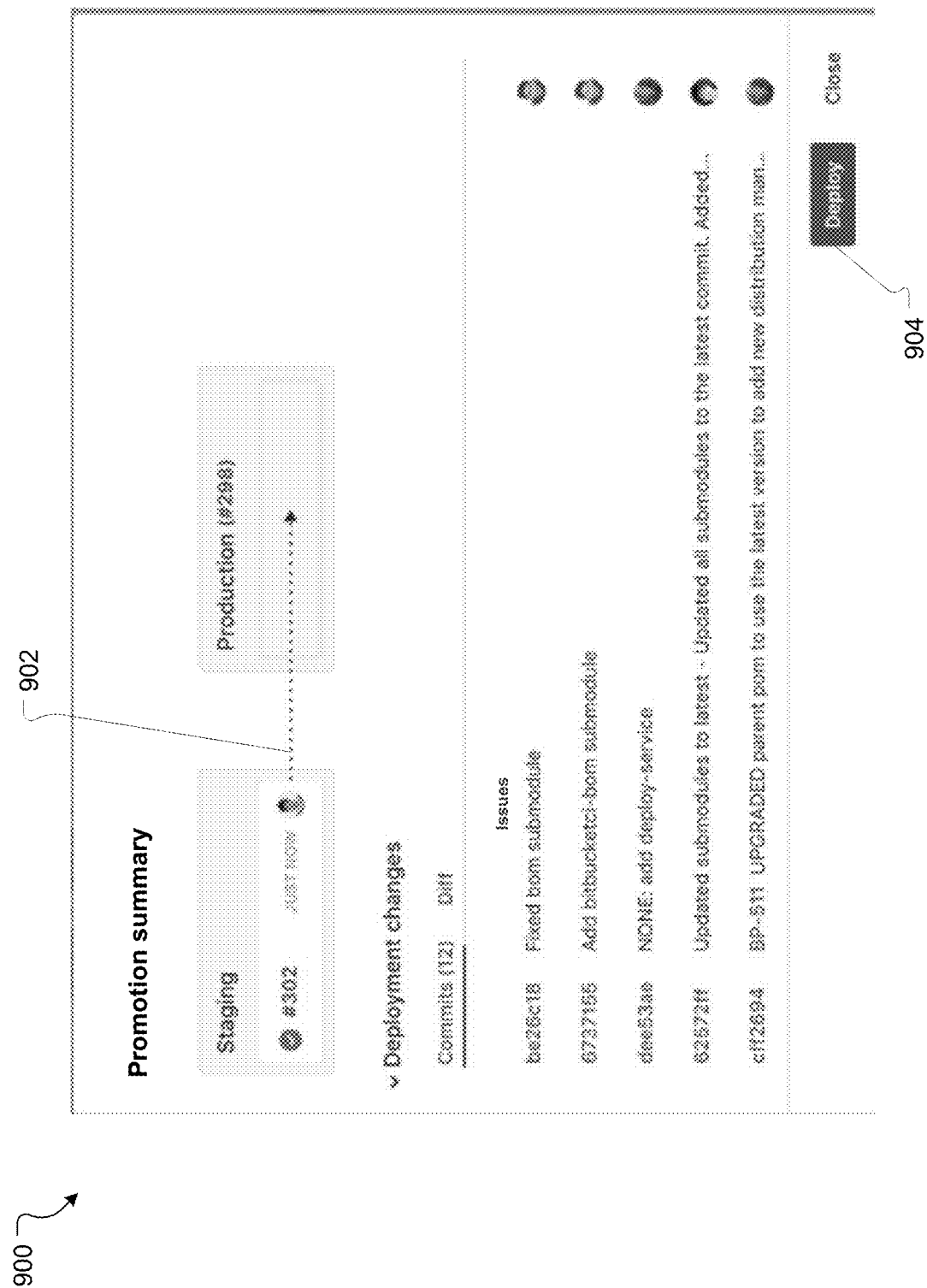
FIG. 9 is an example promotion user interface.

FIG. 9 illustrates an example promotion UI 900 rendered by the client application in response to the developer selecting the interactive control 802 from user interface 800.

The user interface 900 includes one or more controls 902, 904 to trigger a promotion from one environment to another. In the example UI 900, one control may be a dragging action to drag deployment number 302 from the staging card 420 to the production card 422. Another control may be the 'deploy' affordance 904 located at the bottom right corner of the user interface 900.

In addition to allowing users to promote deployment 302 from the staging environment to the production environment, UI 900 may also include indication of the latest deployment in the production environment (e.g., deployment number 298 in this example UI) and show a preview of the changes this promotion (e.g., promotion of deployment number 302) may cause in the production environment. This preview is similar to the preview described with reference to FIGS. 3 and 6 and accordingly the same method steps (i.e., steps 330-340) may be performed to render this preview in the promotion UI 900.

It will be appreciated that FIGS. 8 and 9 illustrate example UIs for obtaining user approval to promote a source code revision. The client application may be configured to render any other types of UIs for obtaining this approval. For instance, client application may present a dedicated page for promotions that lists a number of deployment available for promotion (e.g., from testing to staging or staging to production). A user may be able to select multiple promotions (not in the same environments obviously) from such a UI. Alternatively, the client application may notify users of available promotions by displaying an alert or pop-up window (e.g., in dashboard 400 or 800) via which the user may be able to trigger a promotion.

In any case, once a user triggers a promotion, the client application prepares a message confirming promotion of the selected source code revision to the selected environment and forwards this message to the tracking system 108, which in turn forwards this message to the CI management system 106.

Returning to FIG. 7, once the CI management system 106 receives this message (at step 706), it may deploy the selected source code revision in the selected environment. For example using the process described with reference to step 208 of FIG. 2.

After the source code revision is deployed, the CI management system 106 may notify the tracking system 108 that the deployment is completed (e.g., by generating and transmitting a deployment request). The tracking system 108 informs the client application that deployment in the next environment is completed so that the client application may update the status of the deployment is the deployments UI.

Hardware Overview

The operations/techniques described herein are implemented by one or more special-purpose computing systems or devices. For example, in networked infrastructure 100: SCM system 104 may be provided by a computer system; the client devices 102 are computer systems; the CI management system 106 is provided by one or more computer systems; the tracking system 108 is provided by one or more distributed computing systems, and the computing resources on the cloud computing platform 116 are also provided by one or more computer systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 10:
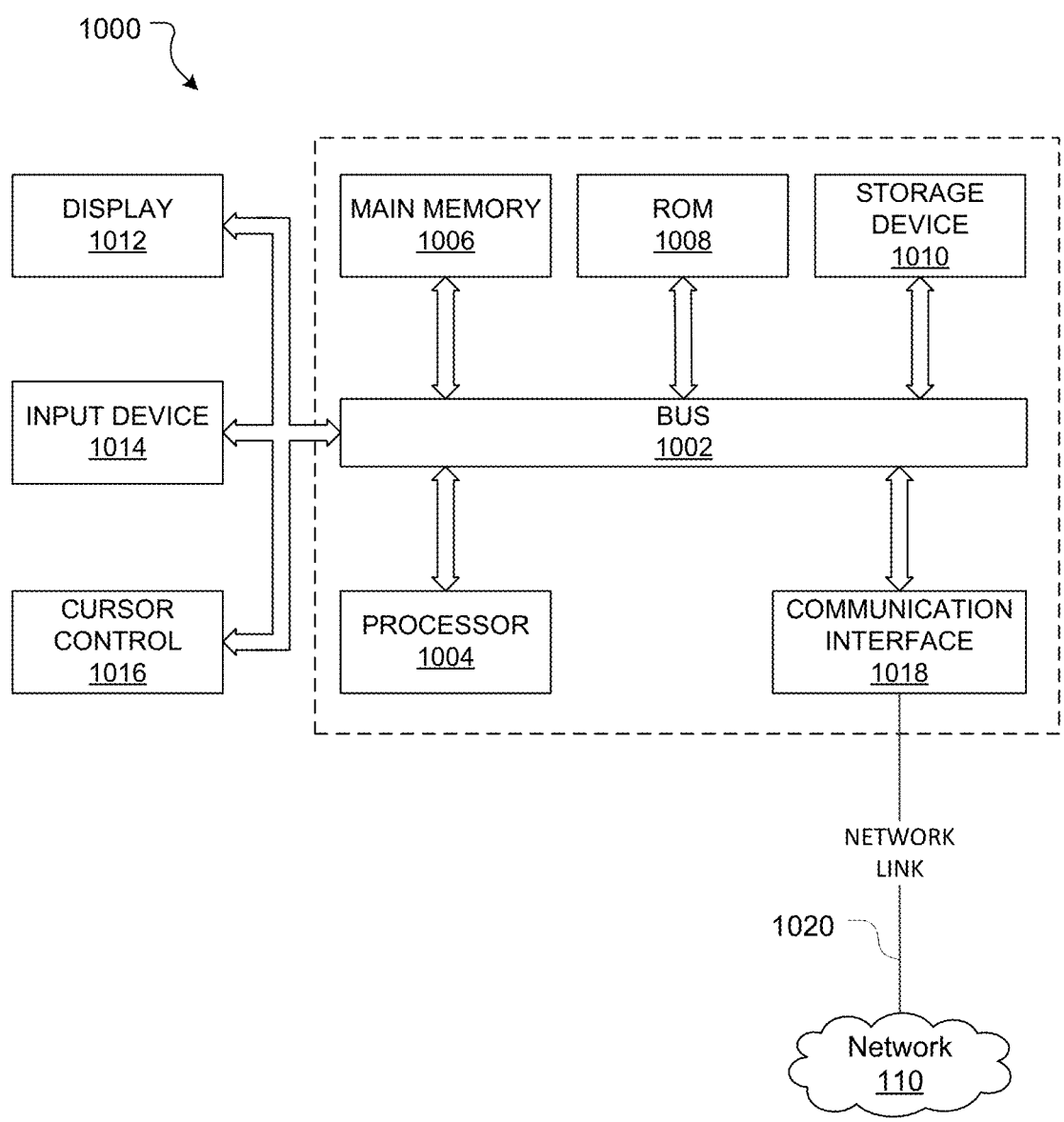
FIG. 10 is a block diagram illustrating a computer system, which may be used to implement various embodiments.

By way of example, FIG. 10 provides a block diagram that illustrates one example of a computer system 1000 upon which embodiments of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor, a graphical processing unit, or other processing unit.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

In case the computer system 1000 is the client device 102, the computer system 1000 may be coupled via bus 1002 to a display 1012 (such as an LCD, LED, touch screen display or other display), for displaying information to a computer user. An input device 1014, including alphanumeric and other keys, may be coupled to the bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Computer system 1000 also includes a communication interface 1018 coupled to bus 1002. Communication interface 1018 provides a two-way data communication coupling to a network link 1020 that is connected to the communication network 110. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Computer system 1000 can send messages and receive data, including program code, through the network(s) 110, network link 1020 and communication interface 1018. In case the computer system hosts the CI management system 106, the computer system 1000 may receive an event notification from the SCM system 104 via the network 110, network link 1020, and communication interface 1018. The received event notification may be executed by processor 1004 as it is received, and/or stored in storage device 1010, or other non-volatile storage for later execution.

As described previously, the computer system 1000 as described above may be configured in a plurality of useful arrangements. In one arrangement, the computer system 1000 is a server computer (such as a computer system hosting the CI management system 106) comprising one or more non-transitory computer-readable data storage media stored with one or more sequences of instructions/software modules which when executed cause the computer to perform the operations/techniques that are described herein.

Some aspects of the present disclosure are described with respect to three deployment environments—testing, staging, and production. However, the systems and methods disclosed herein are not limited to three environments or just these environments. Instead, in some implementations, source code revisions may be deployed in multiple different environments (e.g., multiple testing environments, and/or multiple production environments). Which environments a particular build is meant to be deployed in can be defined in the deployment descriptor.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A computer-implemented method for tracking source code deployments, the method comprising:
  receiving an event descriptor, the event descriptor indicating that a source code repository is updated with a source code revision;
  retrieving a deployment descriptor associated with the source code repository;
  comparing the event descriptor with the deployment descriptor to determine whether the source code revision needs to be deployed;
  in response to determining that the source code revision needs to be deployed, communicating deployment information corresponding to a status of a current source code deployment to a tracking system, the deployment information comprising at least a deployment identifier and a source code revision identifier, the tracking system configured to:
    utilize the deployment information to obtain a list of undeployed source code revisions that occurred between the current source code deployment and an immediately preceding source code deployment and information related to undeployed source code revisions in the list of undeployed source code revisions;
    receive, from a user interface associated with a client device, a request for information related to the current source code deployment; and in response to receiving the request, causing the user interface to display the list of undeployed source code revisions and the information related to the undeployed source code revisions; and in response to receiving a user selection of the source code revision for deployment, deploying the source code revision as part of the current source code deployment.

2. The computer-implemented method of claim 1, wherein utilizing the deployment information to obtain the list of undeployed source code revisions includes:

identifying a source code revision identifier of a source code deployment immediately preceding the current source code deployment; and retrieving source code revision identifiers of the current source code deployment and the immediately preceding source code deployment.

3. The computer-implemented method of claim 1, wherein utilizing the deployment information to obtain the list of undeployed source code revisions includes:

identifying a source code revision identifier of a source code deployment immediately preceding the current source code deployment; and retrieving one or more changes to source code between the current source code deployment and the immediately preceding source code deployment, the retrieving based on source code revision identifiers of the current source code deployment and the immediately preceding source code deployment.

4. The computer-implemented method of claim 1, wherein utilizing the deployment information to obtain information related to the undeployed source code revisions includes:

retrieving one or more issues associated with the current source code deployment from an issue tracking system, the retrieving based on the source code revision identifier of the current source code deployment and the immediately preceding source code deployment.

5. A system for tracking source code deployments, the system comprising:

a processor;

a non-transitory computer-readable storage medium storing sequences of instructions, which when executed by the processor, cause the processor to:

receive an event descriptor, the event descriptor indicating that a source code repository is updated with a source code revision;

retrieve a deployment descriptor associated with the source code repository;

compare the event descriptor with the deployment descriptor to determine whether the source code revision needs to be deployed;

in response to determining that the source code revision needs to be deployed, communicate deployment information corresponding to a status of a current source code deployment to a tracking system, the deployment information comprising at least a deployment identifier, and a source code revision identifier, the tracking system configured to:

utilize the deployment information to obtain a list of undeployed source code revisions that occurred between the current source code deployment and an immediately preceding source code deployment and information related to undeployed source code revisions in the list of undeployed source code revisions;

receive, from a user interface associated with a client device, a request for information related to the current source code deployment; and in response to receiving the request, causing the user interface to display the list of undeployed source code revisions and the information related to the undeployed source code revisions; and in response to receiving a user selection of the source code revision for deployment, deploying the source code revision as part of the current source code deployment.

6. The system of claim 5, wherein to utilize the deployment information to obtain the list of undeployed source code revisions, the non-transitory computer-readable storage medium further storing sequences of instructions, which when executed by the processor, cause the processor to:

identify a source code revision identifier of a source code deployment immediately preceding the current source code deployment; and retrieve source code revision identifiers of the current source code deployment and the immediately preceding source code deployment.

7. The system of claim 5, wherein to utilize the deployment information to obtain the list of undeployed source code revisions, the non-transitory computer-readable storage medium storing sequences of instructions, which when executed by the processor, cause the processor to:

identify a source code revision identifier of a source code deployment immediately preceding the current source code deployment; and retrieve one or more changes to the source code between the current source code deployment and the immediately preceding source code deployment, the retrieving based on the source code revision identifiers of the current source code deployment and the immediately preceding source code deployment.

8. The system of claim 5, wherein to utilize the deployment information to obtain the information related to the undeployed source code revisions, the non-transitory computer-readable storage medium storing sequences of instructions, which when executed by the processor, cause the processor to:

retrieve one or more issues associated with the current source code deployment from an issue tracking system, the retrieving based on the source code revision identifier of the current source code deployment and the immediately preceding source code deployment.

9. A method for tracking source code deployments, the method comprising:

receiving deployment information corresponding to a current source code deployment, the deployment information comprising at least a deployment identifier, and a source code revision identifier;

storing the deployment information;

identifying a source code revision identifier of an immediately preceding source code deployment corresponding to the same source code;

utilizing the source code revision identifier of the current source code deployment and the immediately preceding source code deployment to:

obtain a list of undeployed source code revisions that occurred between the current source code deployment and the immediately preceding source code deployment and information related to undeployed source code revisions in the list of undeployed source code revisions;

receive, from a user interface associated with a client device, a request for information related to the current source code deployment; and in response to receiving the request, causing the user interface to display the list of undeployed source code revisions and the information related to the undeployed source code revisions; and in response to receiving a user selection of one or more of the undeployed source code revisions for deployment, deploying the selected ones of the one or more undeployed source code revisions as part of the current source code deployment.

10. The method of claim 9, wherein obtaining the list of undeployed source code revisions that occurred between the current source code deployment and the immediately preceding source code deployment is based on the source code revision identifiers of the current source code deployment and the immediately preceding source code deployment.

11. The method of claim 9, wherein obtaining the list of undeployed source code revisions includes:
retrieving, from a source code management system, one or more changes to the source code between the current source code deployment and the immediately preceding source code deployment, the retrieving based on the source code revision identifiers of the current source code deployment and the immediately preceding source code deployment.

12. The method of claim 9, wherein obtaining the information related to the undeployed source code revisions includes:
retrieving, from a source code management system, identifiers of one or more source code revisions between the current source code deployment and the immediately preceding source code deployment;
retrieving, from an issue tracking system, one or more issues associated with the current source code deployment, the retrieving based on the source code revision identifiers of the current source code deployment , the immediately preceding source code deployment, and the undeployed source code revisions between the current source code deployment and the immediately preceding source code deployment.

13. A system for tracking source code deployments, the system comprising:
a processor;
a non-transitory computer-readable storage medium storing sequences of instructions, which when executed by the processor, cause the processor to:
receive deployment information corresponding to a current source code deployment, the deployment information comprising at least a deployment identifier, and a source code revision identifier;
store the deployment information;
identify a source code revision identifier of an immediately preceding source code deployment corresponding to a same source code;
utilize the source code revision identifier of the current source code deployment and the immediately preceding source code deployment to:

obtain a list of undeployed source code revisions that occurred between the current source code deployment and the immediately preceding source code deployment and information related to undeployed source code revisions in the list of undeployed source code revisions;
receive, from a user interface associated with a client device, a request for information related to the current source code deployment; and
in response to receiving the request, causing the user interface to display the list of undeployed source code revisions and the information related to the undeployed source code revisions; and
in response to receiving a user selection of one or more of the undeployed source code revisions for deployment, deploying the selected ones of the one or more undeployed source code revisions as part of the current source code deployment.

14. The system of claim 13, wherein the list of undeployed source code revisions between the current source code deployment and the immediately preceding source code deployment is based on the source code revision identifiers of the current source code deployment and the immediately preceding source code deployment.

15. The system of claim 13, wherein to obtain the list of undeployed source code revisions, the non-transitory computer-readable storage medium storing sequences of instructions, which when executed by the processor, cause the processor to:
retrieve, from a source code management system, one or more changes to the source code between the current source code deployment and the immediately preceding source code deployment, the retrieving based on the source code revision identifiers of the current source code deployment and the immediately preceding source code deployment.

16. The system of claim 13, wherein to obtaining the information related to the undeployed source code revisions, the non-transitory computer-readable storage medium storing sequences of instructions, which when executed by the processor, cause the processor to:
retrieve, from a source code management system, identifiers of one or more source code revisions between the current source code deployment and the immediately preceding source code deployment;
retrieve, from an issue tracking system, one or more issues associated with the current source code deployment, the retrieving based on the source code revision identifiers of the current source code deployment , the immediately preceding source code deployment, and the undeployed source code revisions between the current source code deployment and the immediately preceding source code deployment.

* * * * *